(12) United States Patent
Thomas et al.

(10) Patent No.: US 9,469,033 B2
(45) Date of Patent: Oct. 18, 2016

(54) SYSTEM AND METHOD FOR ENHANCING REACH OF A ROBOTIC ARM

(75) Inventors: Hughen Gerrard Thomas, Maharashtra (IN); Arjun Mendhi, Maharashtra (IN)

(73) Assignee: Plazma Technologies Pvt. Ltd., Pune (IN)

(*) Notice: Subject to any disclaimer, the term of this patent is extended or adjusted under 35 U.S.C. 154(b) by 608 days.

(21) Appl. No.: 13/884,791

(22) PCT Filed: Nov. 11, 2011

(86) PCT No.: PCT/IN2011/000774
§ 371 (c)(1),
(2), (4) Date: Oct. 31, 2013

(87) PCT Pub. No.: WO2012/063264
PCT Pub. Date: May 18, 2012

(65) Prior Publication Data
US 2014/0088754 A1    Mar. 27, 2014

(30) Foreign Application Priority Data

Nov. 11, 2010    (IN) .......................... 3098/MUM/2010

(51) Int. Cl.
*G06F 19/00* (2011.01)
*B25J 11/00* (2006.01)
*B25J 9/16* (2006.01)

(52) U.S. Cl.
CPC ............... *B25J 11/005* (2013.01); *B25J 9/16* (2013.01); *B25J 9/1666* (2013.01);
(Continued)

(58) Field of Classification Search
CPC ...... B25J 9/16; B25J 19/1666; B25J 11/005; G05B 2219/49348; Y10S 901/02; Y10S 901/14; Y10S 901/29; Y10S 901/41

USPC ........... 700/187, 186, 188; 901/2, 14, 29, 41
See application file for complete search history.

(56) References Cited

U.S. PATENT DOCUMENTS 4,355,447 A * 10/1982  DiMatteo .................. B23C 3/16
                                                    29/26 A
4,970,370 A * 11/1990  Hara ....................... G05B 19/42
                                                   219/124.34
(Continued)

FOREIGN PATENT DOCUMENTS

CN     101259585 A       9/2008
JP     H10187223 A    * 10/1998
(Continued)

OTHER PUBLICATIONS

Yoshihiro, English Translation for reference JP10-187223, Oct. 1998.*

(Continued)

*Primary Examiner* — Jerrah Edwards
*Assistant Examiner* — Rachid Bendidi

(57) ABSTRACT

A system and method for machining a work-piece in restrictive access operating position is disclosed. The system includes a robot arm adapted to access the bottom face of the work-piece; a computation means adapted to compute a central line on the bottom face while ascertaining an area of overlap that is accessible from all sides of the work-piece; and a robot controller adapted to sequentially maneuver the robot arm from one side of the work-piece to other side of the work-piece on the bottom face. Other embodiments are also disclosed.

11 Claims, 9 Drawing Sheets

(52) U.S. Cl.
CPC ... *G05B 2219/49348* (2013.01); *Y10S 901/02* (2013.01); *Y10S 901/14* (2013.01); *Y10S 901/29* (2013.01); *Y10S 901/41* (2013.01)

(56) References Cited

U.S. PATENT DOCUMENTS

| | | | |
|---|---|---|---|
| 5,904,864 A * | 5/1999 | Nester | B23K 9/0288 219/124.34 |
| 6,322,119 B1 | 11/2001 | Schmidt et al. | |
| 2002/0035908 A1 * | 3/2002 | Kawashima | B29D 30/68 83/368 |
| 2003/0038118 A1 * | 2/2003 | Sun | B23K 11/11 219/117.1 |
| 2011/0120978 A1 * | 5/2011 | Takahashi | B23K 11/115 219/86.25 |
| 2013/0213172 A1 * | 8/2013 | Yasuda | G05B 15/00 74/490.05 |

FOREIGN PATENT DOCUMENTS

| | | |
|---|---|---|
| JP | 2005-046966 A | 2/2005 |
| WO | 2009/095267 A1 | 8/2009 |

OTHER PUBLICATIONS

International Search Report issued in PCT/IN2011/000774 mailed on May 31, 2012 (2 pages).

* cited by examiner

SYSTEM AND METHOD FOR ENHANCING REACH OF A ROBOTIC ARM

FIELD OF THE INVENTION

This invention generally relates to industrial robots. More particularly, the invention relates to an industrial robot mounted such that it has the constraint of limited reach.

DEFINITIONS OF THE TERMS USED IN THE SPECIFICATION

The term 'Maximum Reach' used in the specification relates to a parameter that describes the operational range of the industrial robot, more specifically, maximum reach is the measurement from the center of the robot to the fullest extension of the arm of the robot on a particular surface of the work piece.

The term 'Internal contours' used in this specification relates to shapes that are outlines of robotic operation on a work-piece not touching any boundaries of the work-piece, whereby, all sides of these shapes are surrounded by material of the work-piece.

The term 'External contours' used in this specification relates to external shapes that is outlines of robotic operation on a work-piece, whereby, boundary of the shape coincides with the boundaries of the work-piece that is at least one side of the cut is not surrounded by material of the work-piece.

The term 'lead-in' used in this specification relates to a tool impact of predetermined length on the work-pierce, before the start point of the actual required contour.

The term 'lead-out' used in this specification relates to a tool impact of predetermined length on the work-piece, beyond the end point of the actual required contour.

These definitions are in addition to those expressed in the art.

BACKGROUND OF THE INVENTION

Industrial robots are programmed to perform specific technological actions with high precision. These actions are determined by programmed routines that specify the direction, acceleration, velocity, deceleration, and distance pertaining to a series of coordinated motions of industrial robots. Further, the industrial robots are increasingly being used to reduce human labor and manually induced error by automating industrial manufacturing processes.

Generally, industrial robots in the form of robotic arms are used in a variety of applications such as welding, painting, assembly, palletizing, spraying, cutting, and material handling. Usage of robotic arms in such applications increases the speed and accuracy of the job. Typically, the robotic arm or industrial robot is provided with 3 to 9 axis of movement having its wrist adapted to hold a tool for operations such as precision metal cutting, welding and the like. Further, the robotic arms are gantry mounted or floor mounted and movement of a robotic arm is restrained to "Maximum Reach" of the robotic arm, wherein the "Maximum Reach" of the robotic arm is defined by point of mounting of the robotic arm, architecture, and dimensions of the robotic arm. Accordingly, the tool held in a wrist of a robotic arm faces constraint of limited reach and sometimes fails to reach certain areas of a work-piece that are to be worked upon by the tool.

FIG. 1 of the accompanying drawings illustrates a prior-art schematic arrangement 100 of a gantry 50 mounted inverted robotic arm 10 adapted to carry out operations on a rectangular work-piece 20. The arrangement 100 includes a bed 30 supporting the rectangular work-piece 20. The bed 30 is further supported by a plurality of supporting legs 40. The robotic arm 10 is adapted to hold a tool 60 that is adapted to perform operations on the rectangular work-piece 20. The tool 60 can be a plasma cutting torch, a welding torch or any other operation specific tool. Referring to FIG. 1, the robotic arm 10 includes a plurality of elements coupled to each other at its ends for rotating with respect to each other to enhance flexibility and reach of the robotic arm 10. Further, the gantry 50 is also adapted to slide in a restrictive access position including horizontal, parallel or alternatively perpendicular configuration with respect to the bed 30 to facilitate movement of the robotic arm 10 along a length or width of bed 30.

The tool 60 is secured to a wrist of the robotic arm 10, whereby the tool 60 faces a constraint of limited reach that further shortens when the tool 60 is required to operate on bottom face 70 and proximate areas. Further, the reach of the tool 60 held in the wrist of the robotic arm 10 (both floor mounted and gantry mounted) diminishes when operating on the bottom face 70 of the rectangular work-piece 20 as the work-piece material obstructs movement of the robotic arm 10. The reach of the tool 60 held in the wrist of the robotic arm 10 is reduced by varying amounts based on the dimensions of the setup 100, when the tool 60 is operating on the bottom face 70 of the work-piece 20 as compared to when the tool 60 is operating on the top face 80 or side faces of the rectangular work-piece 20. Inability of the tool 60 to work on regions on bottom face 70 of the rectangular work-piece 20 due to inaccessibility of the bottom face 70 causes inoperability on bottom surface 70. Further, movement of the robotic arm 10 in stringent accessible zones defined by "Maximum Reach", architecture and dimensions of the robotic arm 10 may cause damage to the robotic arm 10 due to increase in chances of robotic arm striking the work-piece while reaching out to a faraway zone on the work-piece.

In spite of the above mentioned problems, machining operations or any other operations may be performed on both the top face 80 and the bottom face 70 of the rectangular work-piece 20 as per following steps. In a first step, machining operations are performed on the top face 80 of the rectangular work-piece 20 followed by turning the rectangular work-piece 20 upside down such that the earlier bottom face 70 of the work-piece becomes the top face to facilitate machining of the bottom face 70 as well. In a second step, after turning the rectangular work-piece 20 upside down, the machining operations may now be performed on the top face (bottom face 70 before turning the rectangular work-piece 20 upside down). Thus, machining operations may be performed on both the top face 80 and bottom face 70 of the rectangular work-piece 20 as the tool 60 is adapted to freely and conveniently operate on the top face of the work-piece without any constraint of reach.

However, turning the rectangular work-piece 20 upside down requires manual intervention, which is a difficult task, especially when the rectangular work-piece 20 is heavy and is of large dimensions. Furthermore, turning the rectangular work-piece 20 upside down considerably increases cycle time of the machining operation and can lead to damage of the work piece or the tool held in the wrist of the robotic arm. In some cases, for example welding or plasma cutting operations, temperature of the work piece drastically increases and the work piece cannot be touched for some time immediately after operation thereon, thus, the work piece must be turned around for operations on the other side only after waiting for some time. In other cases, such as painting, the operated surface cannot be touched until drying, thereby requires the operation to be held until the operated surface is dry. Accordingly, turning of the work piece to carry out operations on both surfaces thereof is a tedious task and may adversely affect the cycle time of the operation.

Further, turning the work piece can also be a problem as most beds are not designed to perform such operations, and forcefully turning the work-piece leads to loss of alignment of the bed with respect to the robot or the gantry; and could also damage the bed or the work piece itself.

Thus, a need is felt to enhance reach of the high speed tool 60 on the bottom face 70 of the work piece without turning the rectangular work-piece 20 upside down, thus, decreasing the cycle time of the machining operation and ensuring safety.

OBJECTS OF THE INVENTION

An object of the present invention is to devise a methodology for facilitating an operating tool held in a wrist of a robotic arm to conveniently approach a bottom face of a work piece.

Another object of the present invention is to provide a robotic arm that reduces cycle time of any operation performed thereby on the bottom surface.

Still another object of the present invention is to effectively utilize and maximize area of accessibility of a bottom face of the work piece for being operated upon by a tool held in a wrist of a robotic arm.

Yet another object of the present invention is to increase reach of an operating tool over a bottom face of a work piece, without increasing cycle time of the operation.

Still another object of the present invention is to provide a logic that assists a robotic arm in deciding most appropriate way of reaching in-accessible portions of a face of a work piece.

Still another object of the present invention is to provide a dynamic means for deciding an approach of the robotic arm to enable an operating tool secured thereto to reach in-accessible portions of a face of a work piece based on real-time calculations.

Yet another object of the present invention is to provide a method of operating a robotic arm that exhibits enhanced productivity.

Still another object of the present invention is to provide a method of operating a robotic arm that is restrained from getting damaged by working within "Maximum Reach" of the robotic arm.

Yet another object of the present invention is to provide a method of operating a robotic arm that minimizes manual intervention.

SUMMARY OF THE INVENTION

In accordance with the present invention, there is provided a robotic system for machining a work-piece in restrictive access operating position, said system comprising a robot arm adapted to access the face of the work-piece with restricted reach of the robot, such as the bottom face of a horizontal work piece; a computation means adapted to compute positional coordinates of the tool tip, and a central line on the bottom face while ascertaining an area of overlap that is accessible from all sides of the work-piece; a robot controller adapted to sequentially maneuver the robot arm from one side of the work-piece to other side of said work-piece on the face with restricted reach; and a machining zone adapted to enable a finite area of overlap between the accessible portion on the face of work-piece with restricted reach of robotic arm, from separate directions of approach.

Typically, a reach determination means is adapted to determine: a reach determination means adapted to determine: a maximum reach from all sides of said work-piece; and an axis dividing bottom face of at least one of: said work-piece; and a face of said work-piece with restricted reach exactly into two halves; an intersection determination means adapted to determine whether said axis intersects a curved contour of cut-out profiles on surface of said work-piece, and whether an area of overlap exists between a region spanned from at least two sides of said work-piece to configure a smooth notch-less cut-out on said bottom face; and a memory adapted to store: co-ordinates of said central line, co-ordinates of cut-out sections disposed at said bottom face, and extent of reach of said robot arm to machine said work-piece.

Typically, the controller is further adapted to maneuver co-operative operability of said robot arm and a gantry.

Typically, the work-piece is selected from a group consisting of a metal work-piece; and an alloy work piece.

Typically, the robot arm held tool is selected from a group consisting of tools or devices which can be fixed of a robotic or CNC movement apparatus, and impact the surface of the work-piece, wherein the impact depends on internal parameters like speed of motion and inclination of tool.

Typically, said controller is selected from a group consisting of an Application Specific Integrated Circuit (ASIC), a Field Programmable Gate Array (FPGA), a microcontroller, a microprocessor, and an embedded system on chip (SoC).

Typically, wherein said computation means is further adapted to co-operate with both said reach determination means and said intersection determination means to: shift a dynamic divider of said bottom face of said work-piece, shifting said dynamic divider considering each contour on the bottom face, according to its position relative to the area of overlap; and determine regions on said bottom face lying beyond reach of said area of overlap.

In accordance with the present invention, a method to machine a work-piece in a restrictive access operating position, said method comprising a robotic arm sequentially approaching bottom face of said work-piece for machining a notch-less cut-out profile; dividing said bottom face into almost equal halves by a dynamic divider to ascertain an area of overlap from at least two sides of said work-piece; shifting said dynamic divider considering each contour on the bottom face, according to its position relative to the area of overlap; splitting those particular contours which intersect both boundaries of the area of overlap, and generate two independent non-closed contours by appending a lead-in at its start point and a lead-out at its end-point; repeating the process for each independent contour on the bottom face, until no other contours are remaining; and robot operating on the bottom face in order of contours in the queue for approach from each direction.

Typically, the step of determining regions on said face of the work-piece which lie beyond reach of robotic arm, and optimizing access of the said face, is compatible with any robotic system, operating through a said tool on a work-piece, which has a restricted reach at a particular face of the work-piece.

Typically, the method includes step of adding lead-in and lead-out to start points and end points at the split of a contour intersecting both boundaries of the area of overlap, to be configured on said face of restricted reach of robotic arm of said work-piece, split at the position of the dynamic divider.

Typically, the method further includes steps of determining most optimum position of said dynamic divider to divide said face with restricted reach of the robotic arm of said work-piece into two parts considering each contour on the bottom face individually; and iteratively positioning the two parts on the restricted access face of said work-piece for each contour on the said face, splitting one face in to two using: said dynamic divider over an area of overlap from both sides along length of said work-piece.

BRIEF DESCRIPTION OF THE ACCOMPANYING DRAWINGS

One non-limiting embodiment of the present invention will now be explained in relation to the accompanying drawings, in which.

DETAILED DESCRIPTION OF THE ACCOMPANYING DRAWINGS

Figure 1:
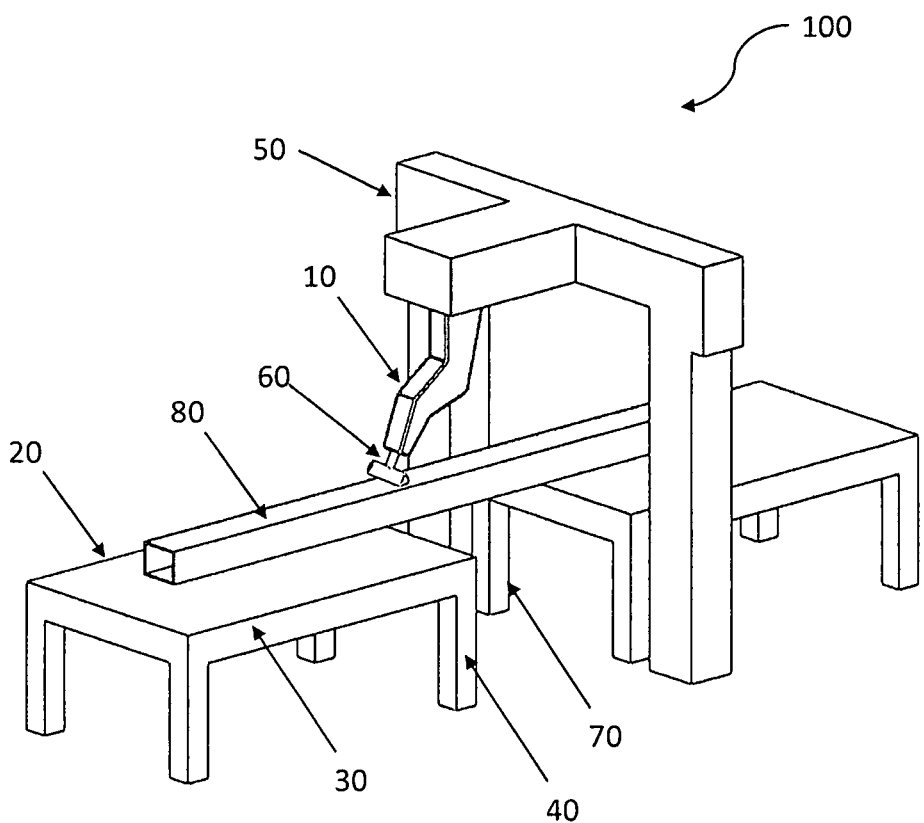
FIG. 1 illustrates a line diagram illustrating a prior art arrangement of a gantry mounted robotic arm adapted to carry out operations on a rectangular work-piece.

Generally, industrial robots in the form of robotic arms are used in a variety of applications such as welding, painting, assembly, palletizing, cutting, and material handling. Use of robotic arms in such applications increases the speed and accuracy of the job. Typically, the robotic arm or industrial robot is provided with 3 to 9 axis of movement and the wrist of the robotic arm is adapted to hold a tool for operations such as precision metal cutting, welding and the like. Further, the robotic arms used in such industrial applications are gantry mounted or floor mounted; as such movement of a robotic arm is restrained to "Maximum Reach" of the robotic arm, wherein the "Maximum Reach" of the robotic arm is defined by point of mounting of the robotic arm, architecture and dimensions of the robotic arm. Accordingly, the tool held in a wrist of a robotic arm faces constraint of limited reach and sometimes fails to reach certain areas of a work-piece that are to be worked upon by the tool.

To overcome the above-mentioned shortcomings, the present invention provides a system and method for machining a work-piece in restrictive access operating position. The system includes a robot arm adapted to access the face of the work-piece with restricted reach of the robot, such as the bottom face of a horizontal work piece; a computation means adapted to compute positional coordinates of the tool tip, and a central line on the bottom face while ascertaining an area of overlap that is accessible from all sides of the work-piece; a robot controller adapted to sequentially maneuver the robot arm from one side of the work-piece to other side of said work-piece on the face with restricted reach; and a machining zone adapted to enable a finite area of overlap between the accessible portion on the face of work-piece with restricted reach of robotic arm, from separate directions of approach.

Still according to the first aspect, a reach determination means adapted to determine: a maximum reach from all sides of said work-piece; and an axis dividing bottom face of at least one of: said work-piece; and a face of said work-piece with restricted reach exactly into two halves; an intersection determination means adapted to determine whether said axis intersects a curved contour of cut-out profiles on surface of said work-piece, and whether an area of overlap exists between a region spanned from at least two sides of said work-piece to configure a smooth notch-less cut-out on said bottom face; and a memory adapted to store: co-ordinates of said central line, co-ordinates of cut-out sections disposed at said bottom face, and extent of reach of said robot arm to machine said work-piece.

Again, according to the first aspect, the controller is further adapted to maneuver co-operative operability of said robot arm and gantry.

Again, according to the first aspect, said work-piece is selected from a group consisting of a metal work piece; and an alloy work piece.

Still, according to the first aspect, said robot arm held tool is selected from a group consisting of tools or devices which can be fixed of a robotic or CNC movement apparatus, and impact the surface of the work-piece, wherein the impact depends on internal parameters like speed of motion and inclination of tool.

Further, said robot arm is selected from a group consisting of a plasma cutting tool and a plasma spraying tool. Further, said robot controller is selected from a group consisting of an Application Specific Integrated Circuit (ASIC), a Field Programmable Gate Array (FPGA), a microcontroller, a microprocessor, and an embedded system on chip (SoC). Still, according to the first aspect, said computation means is further adapted to co-operate with both said reach determination means and said intersection determination means to: shift a dynamic divider of said bottom face of said work-piece, shifting said dynamic divider considering each contour on the bottom face, according to its position relative to the area of overlap; and determine regions on said bottom face lying beyond reach of said area of overlap.

In accordance with a second aspect of the invention, a method to machine a work-piece in a restrictive access operating position is disclosed. The method includes following steps: a robotic arm sequentially approaching bottom face of said work-piece for machining a notch-less cut-out profile; dividing said bottom face into almost equal halves by a dynamic divider to ascertain an area of overlap from at least two sides of said work-piece; shifting said dynamic divider considering each contour on the bottom face, according to its position relative to the area of overlap; splitting those particular contours which intersect both boundaries of the area of overlap, and generate two independent non-closed contours by appending a lead-in at its start point and a lead-out at its end-point; repeating the process for each independent contour on the bottom face, until no other contours are remaining; and robot operating on the bottom face in order of contours in the queue for approach from each direction.

Again, according to the second aspect, the step of determining regions on said face of the work-piece which lie beyond reach of robotic arm, and optimizing access of the said face, is compatible with any robotic system, operating through a said tool on a work-piece, which has a restricted reach at a particular face of the work-piece.

Still, according to the second aspect, the method further includes step of adding lead-in and lead-out to start points and end points at the split of a contour intersecting both boundaries of the area of overlap, to be configured on said face of restricted reach of robotic arm of said work-piece, split at the position of the dynamic divider.

Again, the method further includes steps of determining most optimum position of said dynamic divider to divide said face with restricted reach of the robotic arm of said work-piece into two parts considering each contour on the bottom face individually; and iteratively positioning the two parts on the restricted access face of said work-piece for each contour on the said face, splitting one face in to two using: said dynamic divider over an area of overlap from both sides along length of said work-piece.

Aspects of the invention will now be described with reference to the accompanying drawings which do not limit the scope and ambit of the invention. For illustration of the invention the robotic arm approaching face of the work-piece on which the reach of the robotic arm is restricted, the example of a horizontal work piece with restricted reach on the bottom face is used and described. The description provided is purely by way of example and illustration.

Figure 2:
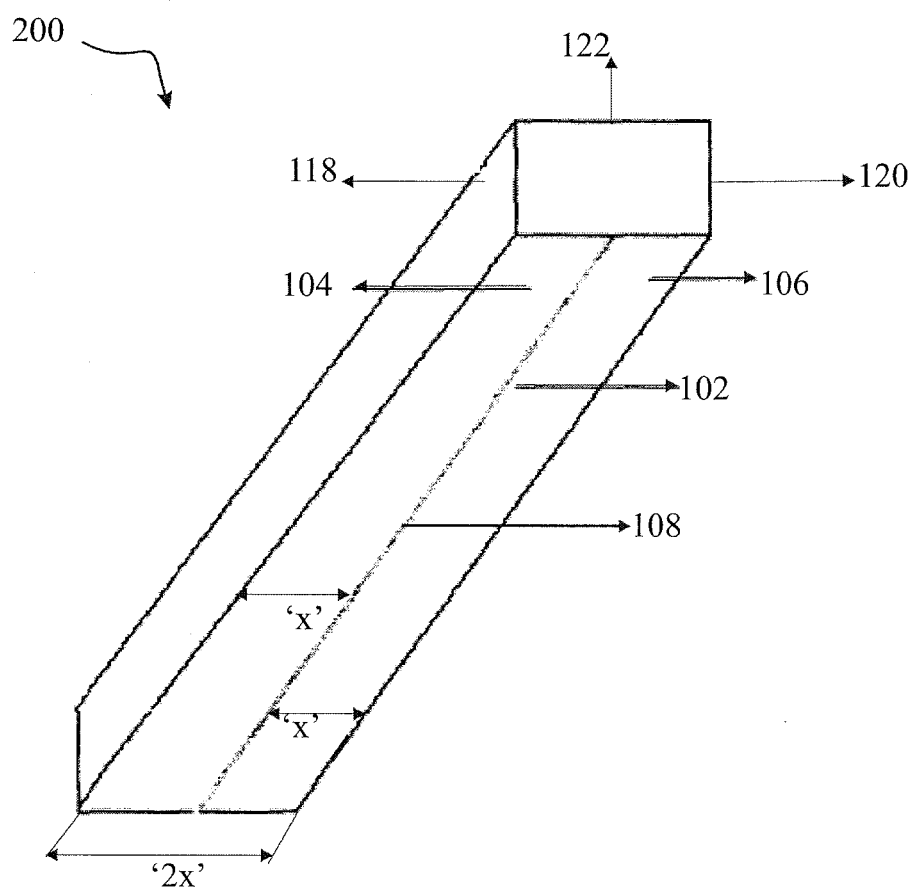
FIG. 2 illustrates a perspective view of the rectangular work-piece whose bottom face is to be machined, wherein a dynamic bottom face divider logically splits a bottom face of the rectangular work-piece in accordance with one embodiment of the present invention.

The schematic diagrams and the description hereto are merely illustrative and only exemplify the invention and in no way limit the scope thereof. FIG. 2 represents a rectangular work piece 200, with the top surface 122, left face 118, right face 120, and the bottom face 102; wherein machining operation is required to be done on the bottom face 102. For machining different shapes or profiles on the bottom face while still minimizing the cycle-time for performing the machining operation by finding out most appropriate path of travel of the machining tool. The arrangement involves approaching the bottom face 102 of the rectangular work-piece 200 from sides thereof, instead of approaching from a front or a back end. However, the present invention may also be used to find most convenient ways of reaching inaccessible portions at a bottom face 102 of a rectangular work-piece 200, machining different cut-out profiles thereon while still reducing the cycle-time for performing the machining operation by finding out most appropriate path of travel of the machining tool while the robotic arm is approaching the bottom face 102 of a rectangular work-piece 200 from either front or back face thereof.

As the bottom face 102 of the rectangular work-piece 200 may not be completely accessible from a single side thereof, the bottom face 102 of the rectangular work-piece 200 is partially accessed from one side and partially accessed from the other side. More specifically, the bottom face 102 of the rectangular work-piece 200 is logically split into two portions that are accessible from either side of the work-piece.

The method developed to facilitate this calculation, assumes at the start of computation, a logical bottom face divider is precisely placed in the middle of the bottom face parallel to the length of the work piece, bisecting the bottom surface in to two equal halves. During the course of the calculations incorporated in the method, this divider will be split and positioned such as to achieve the objectives of the invention.

Figure 3:
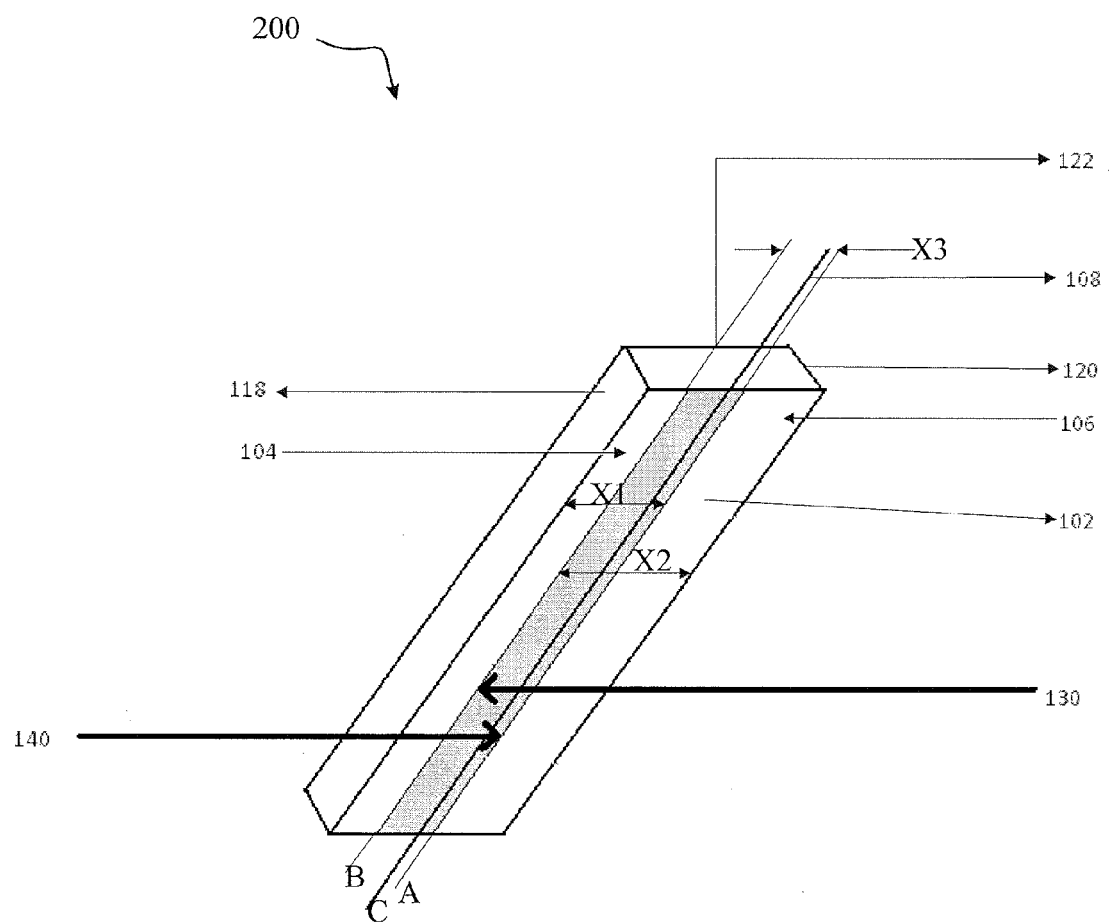
FIG. 3 illustrates an 'area of overlap' on a bottom face of the rectangular work-piece of FIG. 2.
Figure 3A:
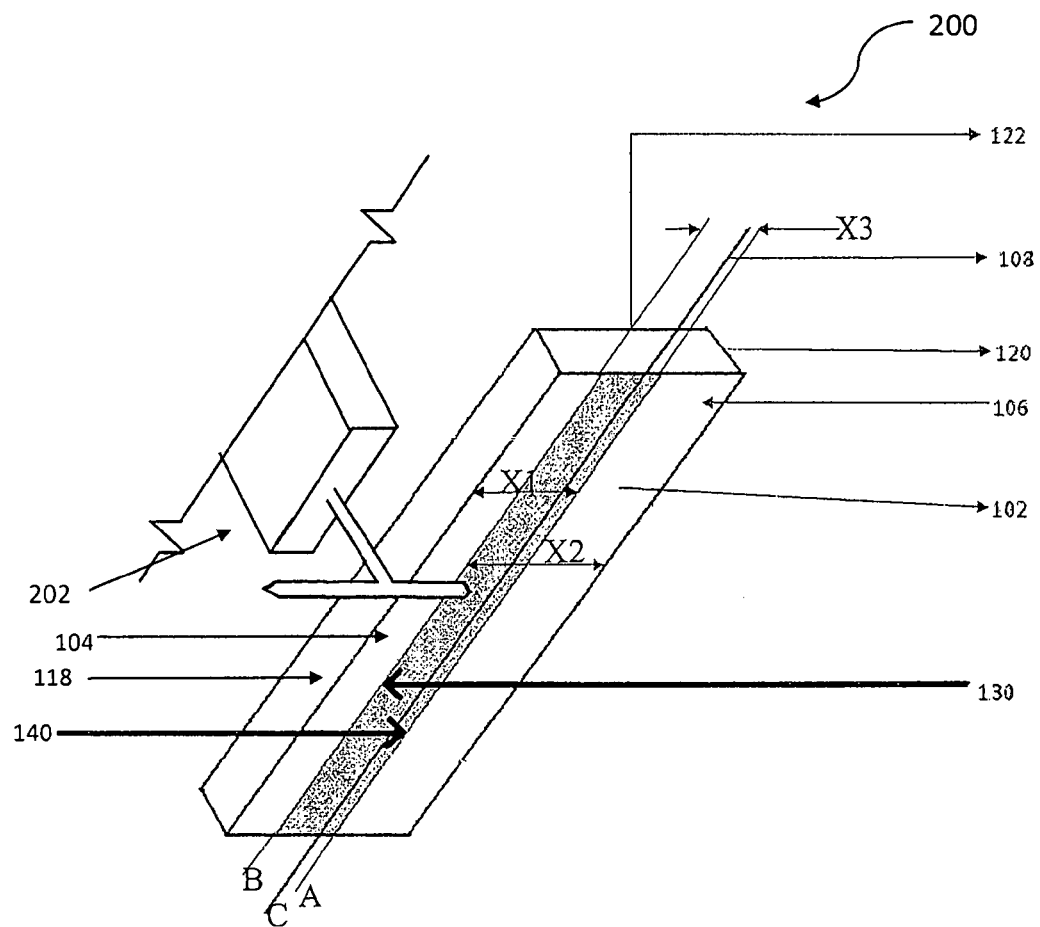
FIG. 3A illustrates maneuver of the robot arm from one side of the rectangular work-piece of FIG. 3.
Figure 3B:
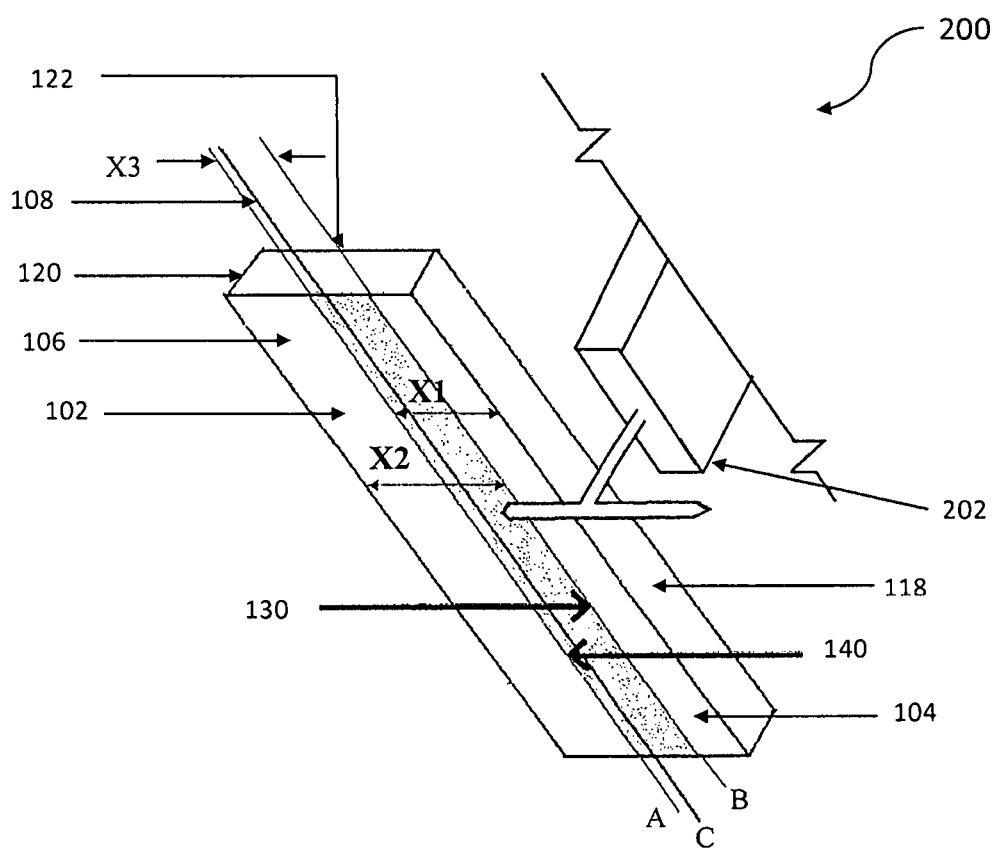
FIG. 3B illustrates maneuver of the robot arm from other side of the rectangular work-piece of FIG. 3.

Referring to FIG. 3 of the accompanying drawings, an enlarged view of the bottom face 102 of the work-piece 200 is illustrated. If the robotic arm approaching the bottom face 102 of the work-piece 200 from the left hand side 118 of the work-piece is having a maximum reach up-to line 140 is represented by X1 and the robotic arm approaching the bottom face 102 of the work-piece 200 from the right hand side 120 of the work-piece is having a maximum reach up-to line 130 is represented by X2, then the region marked as X3 is accessible from both sides of the work-piece 200 and is termed as the 'area of overlap'. If a work-piece is has no area of over-lap, this implies that a certain portion of the work-piece 200 cannot be accessible by approaching from either side of the work-piece 200. More specifically, for convenient machining of cut-out profiles, the work-piece is preferably placed in such a manner in the machining zone that preferably all the cut-out profiles are within the accessible areas of X1 and X2; therefore X3 is greater than or equal to zero. This also helps in defining the dimensional limits of the work piece for bottom face processing based on the requirement of accessible area. FIG. 3A illustrates maneuver of the robot arm 202 from one side of the rectangular work-piece 200 of FIG. 3. FIG. 3B illustrates maneuver of the robot arm 202 from other side of the rectangular work-piece 200 of FIG. 3.

Figure 4:
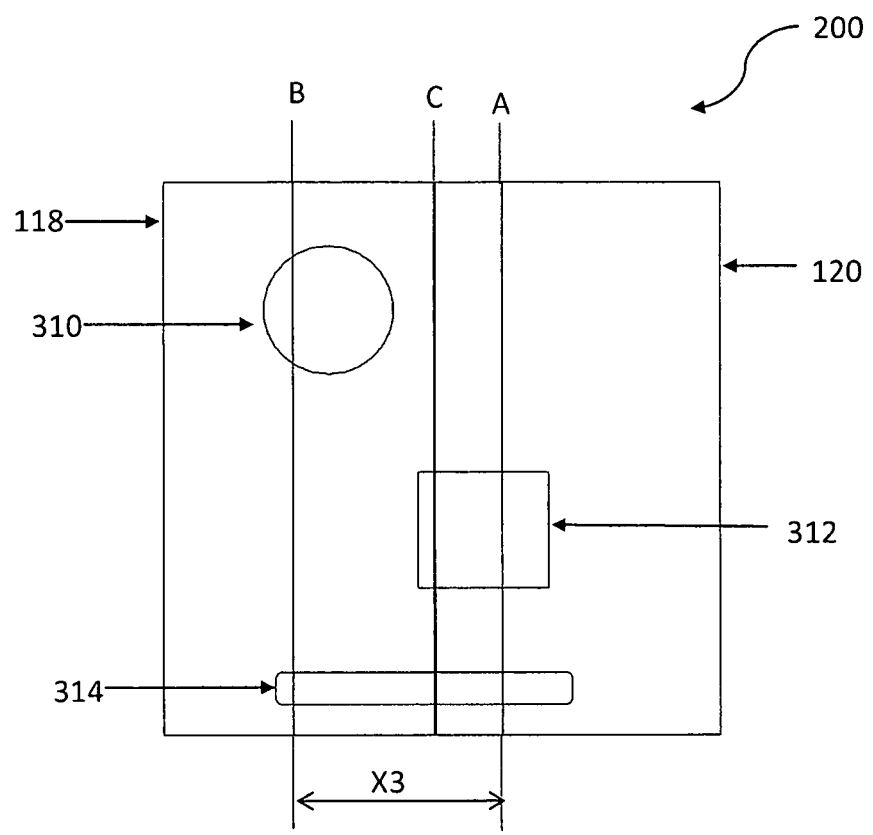
FIG. 4 illustrates another view of a bottom face of a rectangular work-piece, with different cut-out profiles.

FIG. 4 and FIG. 3 of the accompanying drawings illustrate the bottom face of the work piece. More particularly, FIG. 4 illustrates the bottom face with some profiles to be processed thereon. Both FIG. 4 and FIG. 3 highlight the way by which the computation means optimizes the method of processing these shaped profiles. The profiles are so chosen in the FIG. 4 to broadly cover the various possibilities as non-limiting examples. FIG. 4 shows that the bottom face 102, with the dynamic divider at imaginary axis 'C' which divides the bottom face exactly in two halves along the length of the work piece. As seen in FIG. 4, the axis or line depicted by 'A' in the FIG. 4 denotes the maximum reach of the tool when approaching from the left side 118 as determined by the reach determination means. Similarly the axis 'B' demarcates the maximum reach of the tool when approaching the bottom face 102 from the right side 120. The area of overlap is between the lines B and A, with a width of X3.

In accordance with an embodiment of the invention, the dynamic divider of the bottom face axis 'C' as shown in FIG. 4, forms the reference based on which the computation means 1004 decides how to process a required shape on the bottom face 102. At the first level of processing all shapes lying on the bottom face and which do not intersect the dynamic divider are processed from the side on which they lie with respect to 'C'. More specifically, shape 310 in FIG. 4, satisfies this condition and hence the shape 310 will be processed by the tool, by approaching it from the left side 118 of 102. The computation means knows that for such profiles complete accessibility from one side is certain. The second case arises with shapes which intersect the dynamic divider and may lie beyond the area of overlap from one side only.

More specifically, the shape 312 in FIG. 4 is a shape which intersects C and exceeds the area of overlap by intersecting A. The computation means determines that complete accessibility of this shape is possible from one side alone, by shifting the dynamic divider virtually to C1, away from the side on which the contour surpasses or intersects the boundary of area of overlap that results in moving the dynamic divider C to C1 to the left, and accessing the contour from the right side 120 for 312. Hence C is moved to C1 only for processing the shape profile 312, and hence it is now similar to the case of the shape profile 310 and further processed alike.

Then there are cases where the area of overlap does not lie along length of the work-piece. Further, the computation means 1004 determines that this shape profile cannot be processed from one side alone. More specifically, the shape profile 314 cannot be processed by the robotic arm by approaching it from one side alone. At this stage, the computation means 1004 executes the method to determine the most optimum position of the dynamic divider so as to divide this shape virtually into two parts, wherein each part individually reducing to the case above, and the part can be processed for cutting out or operating out smooth contours as in the case of 310. The method also add lead in and lead out to the start and end points of the parts respectively in to the scrap region, to ensure smooth joining of the two parts.

Figure 5:
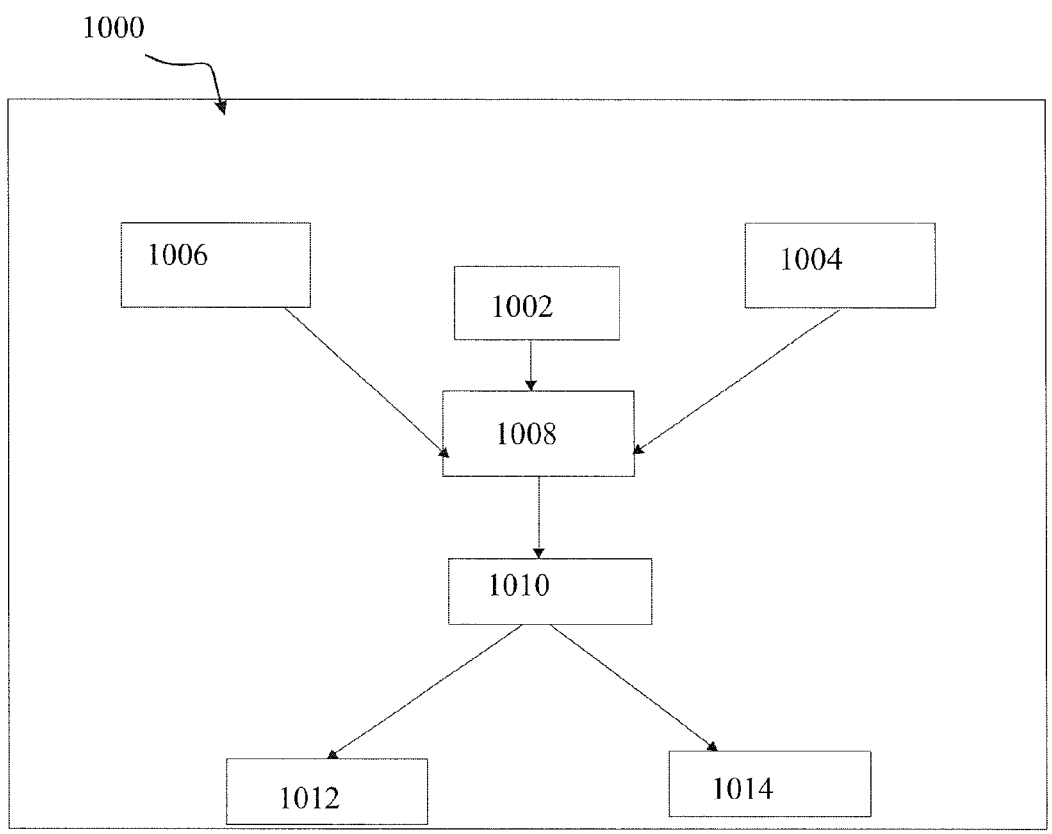
FIG. 5 illustrates a block diagram representation of a system for enhancing accessibility of a bottom face of a work-piece and carrying out any type of operation thereon.

Referring to FIG. 5, a system 1000 is depicted that is adapted for appropriately calculating and logically deciding placement of dynamic divider on the bottom face 102 of a work-piece 200 wherein a reach determination means 1002 is provided for determining reach of the robotic arm from both sides of the work-piece 200. The system includes a computation means 1004 for determining the dimensions and co-ordinates of the profiles that are to be machined on the bottom face 102 of the work-piece 200; an intersection determination means 1006 is also provided to find out if the dynamic divider is intersecting any curved contour of the cut-out profiles. Based on the inputs from the reach determination means 1002, computation means 1004 and intersection determination means 1006, the bottom face 102 of the rectangular work-piece 200 is divided into a left portion 104 and a right portion 106 with a bottom face dynamic divider the logical splitting line 108 (i.e. splitting the bottom face 102 logically into two portions 102 and 104 as shown in FIG. 2), iteratively for each contour on the face. Further, based on the reach of the robotic arm from both sides of the work-piece 200 decisions are made by the system 1000 regarding whether the bottom face 102 of the work-piece 200 should be split or not. For example, if maximum reach on bottom face from one side covers all contours to be cut-out, then according to the first aspect of the invention, all contours will be processed from the respective side, minimizing the operation cycle time.

Figure 6:
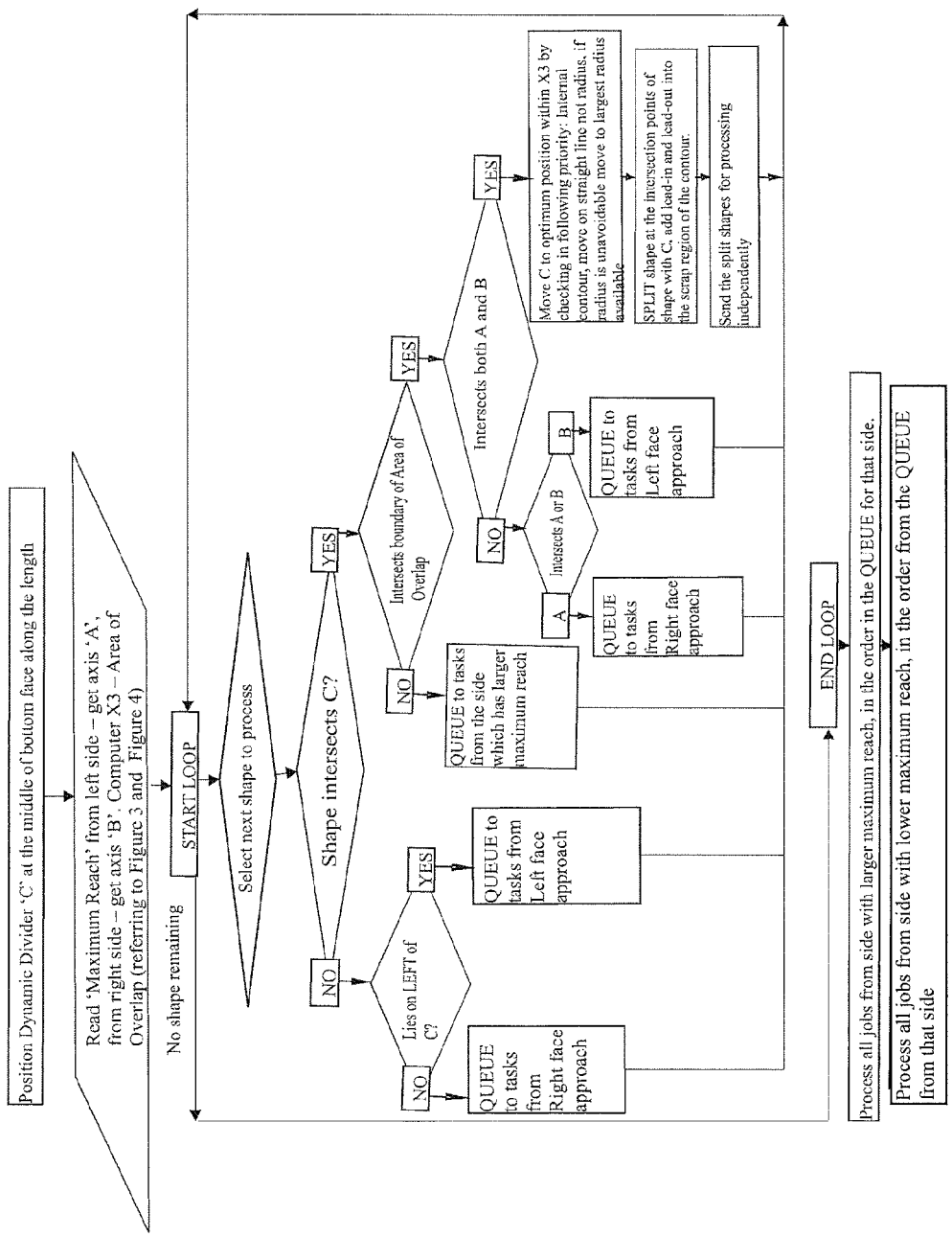
FIG. 6 illustrates a logic flow method for controlling positioning of the dynamic bottom face divider of FIG. 2.

In accordance with another embodiment, position of the bottom face divider 108 may be changed for enabling the machining tool to have accessibility over the entire profile to be cut on the bottom face, the bottom face divider 108 may even be kept at any corner or edge of the bottom face, if each point on the bottom side of the work-piece is covered by the area of overlap. Furthermore, the computation means 1004 is also adapted to take decisions regarding whether the bottom face 102 should be split or not and further the computation means also performs complexity checks during the "dynamic splitting" of the bottom face 102. Moreover, the decisions made by the computation means 1004 are based on a set of predefined logic as illustrated in FIG. 6.

The position of the dynamic divider 108, when splitting a shape on the bottom face 102 of a work-piece 200 is selected in such a manner that the splitting line 108 intersects minimum number of curved portions of each contour profile to be machined on the bottom face 102 of the work-piece 200, while lying in the region X3. In case unavoidable to move the splitting line or dynamic divider 108 to a position within X3 such that it avoids intersecting any curved portion of an internal or external contour shape, the splitting line 108 intersects a curved contour portion of the cut-out profile, adds a lead-in at the start of the portion and a lead-out at the end of that portion, thereby the splitting line 108 divides the cut-out profile into two different cut-out profiles positioned at either side of the splitting line 108.

Further, the machining tool first moves along the cut-out profile disposed on the left hand side of the splitting line 108 by approaching from the left hand side of the work-piece 200 to define a first path of travel and thereafter move along the cut-out profile disposed on the right hand side of the splitting line 108 by approaching from the right hand side of the work-piece 200 to define a second path of travel. However, the intersection of the splitting line 108 with the curved contour portions of the cut-out profiles to be machined is avoided because such an arrangement may cause creation of notch at the point of intersection of the first and second path of travel of the machining tools.

If the bottom-face divider 108 is splitting a curved contour of a the cut-out profile to be machined on the bottom face 102, then the splitting line 108 is shifted either leftwards or rightwards by a distance equal to the radius of the profile plus a cushion value, until it is within the maximum reach of approach from the respective side. If after shifting the bottom-face divider 108, the splitting line 108 is not intersecting the contour of the cut-out profiles to be machined, the machining operation is initiated. If it contour is spread across both the boundaries of the area of overlap, and is essential to split the profile, then using this shifting method the computation means determines a position if possible of the dynamic divider splitting line, which does not intersect a curved portion of the profile. In this manner, the intersection of the splitting line 108 with the curved contour portions of the cut-out profiles to be machined is avoided.

In some cases however it may not be possible to move the dynamic bottom face divider to avoid all radii of a shape to be split in the zone X3, then preference is given to split the largest radius value. After the position of the bottom face divider 108 is set, the bottom face 102 is virtually split along the bottom face divider 108, thereby resulting in five sides i.e. 104, 106, 118, 120 and 122 of the rectangular work-piece 200. Accordingly, the machining tool is input with information for a five sided work piece 200, with individual profiles and coordinates to process.

The positions of bottom face divider, positions and co-ordinates of the cut-out sections disposed at the bottom face 102 of the work-piece 200 and the reach of the robotic arm carrying the machining tool from both sides of the work-piece 200 is stored in a temporary memory 1008, which is further read for performing operations. This temporary memory 1008 is read by a controller 1010 that is adapted to control the robotic arm or robot attached to the gantry. The controller 1010 further initiates the operation by triggering the driving means 1012 which controls the movements of the robotic arm over the work piece and also triggers the cutting means 1014.

Further, the computing means 1004 is adapted to minimize the impact of the "dynamic splitting" of the bottom face 102 by the bottom face divider 108 over the cycle time for carrying out the machining operation. More specifically, the computing means 1004 takes decisions regarding whether a shape on the bottom face 102 should be split or not. The cycle time of the machining operation is increased when a contour or shape is split mainly due to increase in lead-in and lead-out, increase in cutting distance, two-times turning on and turning off of the machining tool instead of once and other machine specific over-heads. To minimize the impact, the computation means at run-time dynamically place the divider at such positions within the area of overlap, with an attempt to avoid any splitting requirement, and where splitting is unavoidable it consider factors to optimize the splitting position on that shape.

Still further, the complexity involved in splitting a external contour is far less than splitting an internal contour, since in most popular formats external contours in the source files are traced with the coordinates, whereas and internal contour is traced with parameters. For example an internal contour of a circle 114 or 112, is given to the system as a center and radius value, whereas external contour 116 is given as a trace of coordinate values. Hence the computing means 1004 reads the coordinates of all profiles on the bottom face and on the run decides where to place the bottom divider, by avoiding splitting any internal contours, and if unavoidable performs a split of the external contours. Accordingly, the computing means 1004 achieves an optimum balance, providing cycle time reduction and computation complexity control which keeps the system high in performance and maintainable.

Further, the computing means 1004 disclosed herein is also adapted to perform complexity checks during the "dynamic splitting" wherein the complexity checks facilitates in deciding the position of the bottom face divider 108 on the bottom face 102 and minimizing the complexity involved in the splitting. However, it is within the scope of the present invention to alter the priority to suit alterations in the system configuration and performance related preferences.

In nutshell, decision regarding positioning of the bottom face divider 108 is governed by three main objectives that are increasing accessibility, reducing impact on cycle time and reducing complexity in approaching the bottom face 102 in this priority.

Figure 7:
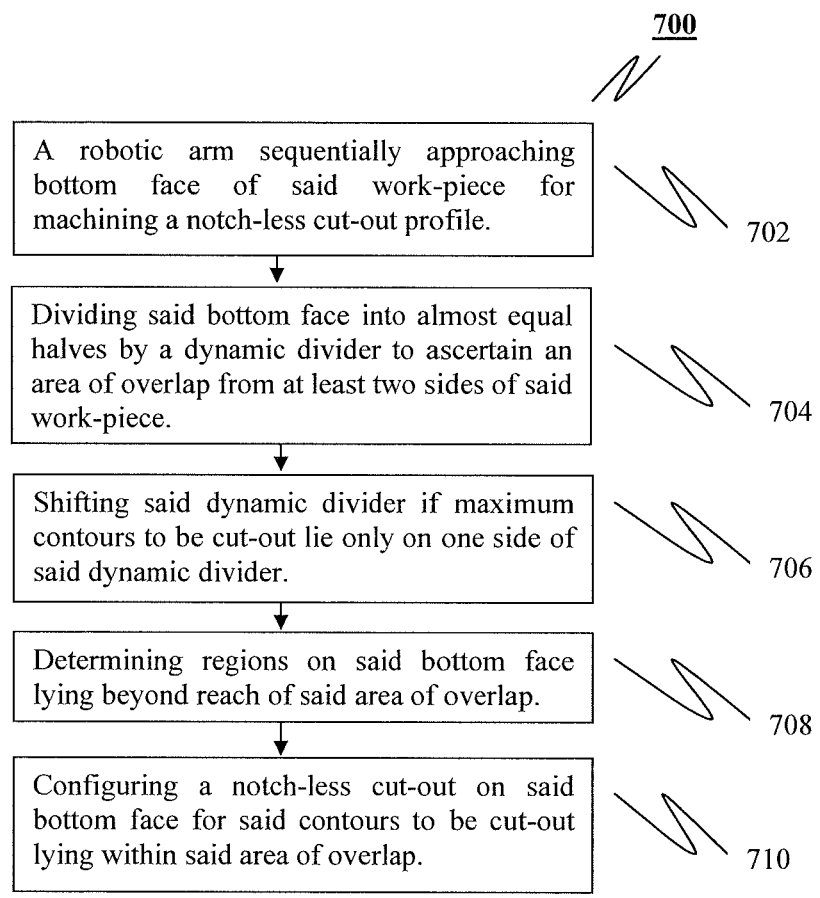
FIG. 7 illustrates a flow chart depicting a method of configuring notch-fewer contours by enhancing reach of a robot arm.

FIG. 7 illustrates a flow chart 700 depicting a method of machining a notch-less profile. A first step 702 comprises a robotic arm sequentially approaching bottom face of said work-piece for machining a notch-less cut-out profile on said work-piece. Here the reach determination means computes the maximum reach from all sides on the work piece. A second step 704 comprises dividing said bottom face into almost equal halves by a dynamic divider to ascertain an area of overlap from at least two sides of said work-piece. A third step 706 comprises shifting said dynamic divider considering each contour on the bottom face, according to its position relative to the area of overlap. A fourth step 708 comprises of splitting those particular contours which intersect both boundaries of the area of overlap, and generate two independent non-closed contours by appending a lead-in at its start point and a lead-out at its end-point. A fifth step 710 comprises of repeating the process for each independent contour on the bottom face, until no other contours are remaining A sixth step 712 requires the robot to operate on the bottom face in order of contours in the queue for approach from each direction.

Technical Advancements and Economic Significance

The present invention provides a methodology for facilitating an operating tool held in a wrist of a robotic arm in conveniently approaching a face of a work piece with restricted reach, such as the bottom face of a horizontal work-piece, and performing operation thereon by effectively utilizing and maximizing area of accessibility of the face of the work piece on which the reach of the robot is restricted. Further, the method of performing operations on a bottom face of the work-piece is adapted to reduce cycle time of the operations and thereby enhance productivity. Furthermore, the method of performing operations include computing means performing real time calculations and facilitating the robotic arm in deciding most appropriate and optimized method of reaching in-accessible portions of a work piece. Still further, the robotic arm working in accordance with the method of present invention works within "Maximum Reach" and is therefore restrained from getting damaged. Moreover, the method of operating the robotic arm reduces manual intervention.

The Tool Scope:

The term cutting means, plasma tool or just tool have been used for purpose of explanation of the principles of the invention by illustration and example. However, the complete scope of the invention lies over all tools or devices which can be fixed of a robotic or CNC movement apparatus, and impact the surface of the work-piece, wherein the impact depends on internal parameters like speed of motion, inclination of tool, etc. Some examples of tools under the scope of this invention are: plasma metal cutting torch, paint gun, plasma spraying, arc welding, water jet, laser cutting tool, deburring tool and grinding tool.

Again, according to the first aspect, said work-piece is selected from a group consisting of a metal work piece; and an alloy work piece. Further, said robot arm is selected from a group consisting of a plasma cutting tool and a plasma spraying tool. Further, said robot controller is selected from a group consisting of an Application Specific Integrated Circuit (ASIC), a Field Programmable Gate Array (FPGA), a microcontroller, a microprocessor, and an embedded system on chip (SoC).

The present invention is applicable to operation of any cutting and spraying tool operating on a substance at a plurality of predetermined locations, where the output/outcome of the tool is in direct proportion to the time in which the tool operates/present on/at specified locations on a material. Tool in question can include the following tools: cutting, joining, welding, material application, burring, cleaning, deburring, polishing, buffing, milling, tapping, stitching, brushing, shaping, forming, plating. The system and the corresponding method involved, enable intelligent operation on the part of the system, to provide virtually extended reach of the robotic arm, while preserving dimensional accuracy of the output.

The numeral values given of various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A robotic system for machining a work-piece in restrictive access operating position, said system comprising:
   a robot arm adapted to access a face of the work-piece with a restricted reach of the robot arm of a robot, wherein the face is a bottom face of the work-piece;
   a reach determination means adapted to determine a maximum reach of a tool held by the robot arm on the bottom face of the of the work-piece from both sides of the work-piece;
   a computation means adapted to:
      compute positional coordinates of the tip of the tool held by the robot arm;
      compute positional coordinates of a central line on the bottom face; and
      compute, based on the maximum reach, an area of overlap located on the bottom face and comprising the central line that is accessible from both sides of the work-piece; and
   a robot controller adapted to:
      sequentially maneuver the robot arm on the bottom face from one side of the work-piece to other side of the work-piece crossing the central line and
      position the central line on the area of overlap on the bottom face of the work-piece in a machining zone such that the area of overlap is within the restricted reach of the robot arm from each of the opposite sides of the workpiece.

2. The system as claimed in claim 1, wherein:
   the reach determination means further adapted to determine an axis dividing at least one of the bottom face of said work-piece and the face of said work-piece with the restricted reach exactly into two halves, and
   the system further comprises:
      an intersection determination means adapted to determine whether said axis intersects a curved contour of cut-out profiles on surface of the face of said work-piece with the restricted reach of the robot arm and whether the area of overlap exists between regions accessible from at least two sides of said work-piece to configure a smooth notch-less cut-out on said bottom face; and
      a memory adapted to store the computed positional co-ordinates of said central line, positional co-ordinates of the cut-out profiles disposed at said bottom face, and extent of reach of said robot arm to machine said work-piece.

3. The system as claimed in claim 1, wherein said robot controller further adapted to maneuver co-operative operability of said robot arm and a gantry.

4. The system as claimed in claim 1, wherein said work-piece is selected from a group consisting of a metal work piece and an alloy work piece.

5. The system as claimed in claim 1, wherein:
   the tool held by the robot arm is selected from a group consisting of tools or devices which can be fixed to a robotic or computer numerical control (CNC) movement apparatus and impact the bottom face of the work-piece and
   the impact depends on internal parameters comprising speed of motion and inclination of the tool.

6. The system as claimed in claim 1, wherein said robot controller is driven by devices selected from a group consisting of an Application Specific Integrated Circuit (ASIC), a Field Programmable Gate Array (FPGA), a microcontroller, a microprocessor, and an embedded system on chip (SoC).

7. The system as claimed in claim 1, wherein said computation means further adapted to co-operate with both said reach determination means and said intersection determination means to shift a dynamic divider of said bottom face of said work-piece, considering each contour of cut-outs to be machined on the bottom face, according to a position of the contour relative to the area of overlap and determine regions on said bottom face lying beyond the restricted reach of the robot arm of the robot.

8. A method to machine a work-piece in a restrictive access operating position, said method comprising:
   I. sequentially approaching bottom face of said work-piece by a robot arm of a robot for machining a notch-less cut-out profile, wherein the bottom face comprises a restricted reach of the robot arm of the robot;
   II. dividing said bottom face into almost equal halves by a dynamic divider to ascertain an area of overlap comprising the dynamic divider from at least two sides of said work-piece, wherein the area of overlap is within the restricted reach of the robot arm of the robot;
   III. shifting said dynamic divider considering each contour of cut-outs to be machined on the bottom face according to a position of the dynamic divider relative to the area of overlap;
   IV. splitting a contour which intersects both boundaries of the area of overlap to generate two independent non-closed contours by appending a lead-in at a start point of the contour and a lead-out at an end-point of the contour;
   repeating steps I-IV for each independent contour on the bottom face until no other contours are remaining; and
   operating on the bottom face by the robot arm in order of contours in a queue for approach from each direction, wherein the operating comprises positioning the dynamic divider on the area of overlap on the bottom face of the work-piece in a machining zone such that the area of overlap is within the restricted reach of the robot arm from each of the opposite sides of the workpiece.

9. The method as claimed in claim 8, further comprising determining regions on said bottom face of the work-piece which lie beyond a reach of the robot arm of a robot and optimizing access of the robot arm to the bottom face, wherein the robot arm is compatible with any robotic system, is operating through a tool on the bottom face of the work-piece, and has a restricted reach.

10. The method as claimed in claim 8, wherein the contour is cut on said bottom face of the work-piece with a restricted reach of the robot arm of a robot and wherein the contour is split at the position of the dynamic divider.

11. The method as claimed in claim 8 further comprising:
   determining the optimum position of said dynamic divider to divide said bottom face with the restricted reach of the robot arm of said work-piece into two parts considering each contour on the bottom face individually, and
   iteratively positioning the two parts on the bottom face of said work-piece for each contour on the bottom face by splitting one face into two using said dynamic divider over the area of overlap from both sides along the length of said work-piece.

* * * * *